(12) United States Patent
Algüera Gallego

(10) Patent No.: US 8,864,214 B2
(45) Date of Patent: Oct. 21, 2014

(54) AIR-CONDUCTING SYSTEM

(76) Inventor: José Manuel Algüera Gallego, Aschaffenburg (DE)

( * ) Notice: Subject to any disclaimer, the term of this patent is extended or adjusted under 35 U.S.C. 154(b) by 0 days.

(21) Appl. No.: 13/514,333

(22) PCT Filed: Dec. 10, 2010

(86) PCT No.: PCT/EP2010/069335
§ 371 (c)(1),
(2), (4) Date: Jun. 7, 2012

(87) PCT Pub. No.: WO2011/070132
PCT Pub. Date: Jun. 16, 2011

(65) Prior Publication Data
US 2012/0242108 A1    Sep. 27, 2012

(30) Foreign Application Priority Data
Dec. 11, 2009  (DE) .......................... 10 2009 054 570

(51) Int. Cl.
*B62D 37/02* (2006.01)
*B62D 53/08* (2006.01)
*B62D 35/00* (2006.01)

(52) U.S. Cl.
CPC .......... *B62D 35/001* (2013.01); *B62D 53/0814* (2013.01)
USPC .................................................... 296/180.5

(58) Field of Classification Search
CPC .. B62D 53/08; B62D 53/0885; B62D 53/125; B62D 53/0814; B62D 35/001; B62D 53/0807; B62D 29/002; B62D 53/085; B62D 53/10; B62D 29/001; B60S 9/08; B60S 9/02; F16N 11/00; F16N 3/12; H01R 13/005; H01R 13/639; H01R 2201/26; F16B 43/00

USPC ............ 296/180.1–180.5, 191; 280/768, 849, 280/762

See application file for complete search history.

(56) References Cited

U.S. PATENT DOCUMENTS

| 4,102,548 | A  * | 7/1978 | Kangas ...................... 296/180.3 |
| 4,904,015 | A  * | 2/1990 | Haines ........................ 296/180.3 |
| 6,378,932 | B1 * | 4/2002 | Fasel et al. ................. 296/180.5 |
| 6,428,084 | B1 * | 8/2002 | Liss ............................ 296/180.3 |
| 6,886,882 | B2 * | 5/2005 | Farlow et al. .............. 296/180.4 |
| 7,118,164 | B2 * | 10/2006 | Frank et al. ................ 296/180.5 |
| 7,565,233 | B2 * | 7/2009 | Logdberg ........................ 701/70 |

FOREIGN PATENT DOCUMENTS

| DE | 10 2005 048 142 A1 | 4/2007 |
| EP | 0 406 036 A1 | 1/1991 |
| EP | 1 905 674 A1 | 4/2008 |
| GB | 2 295 587 A | 6/1996 |
| GB | 2 435 246 A | 8/2007 |
| WO | 2006 029732 A1 | 3/2006 |

* cited by examiner

*Primary Examiner* — Glenn Dayoan
*Assistant Examiner* — Sunsurraye Westbrook
(74) *Attorney, Agent, or Firm* — Hudak, Shunk & Farine Co. LPA

(57) ABSTRACT

An air-conducting system for a tractor and/or trailer is described, wherein at least one of the vehicles has a wind deflector. The problem addressed by the invention was to improve the aerodynamic drag of tractors and/or trailers. The problem is solved according to the invention by an air-conducting system in which the wind deflector is arranged at the rear of the trailer and/or at the rear and/or in the front region of the tractor and can be adjusted depending on the driving speed.

17 Claims, 4 Drawing Sheets

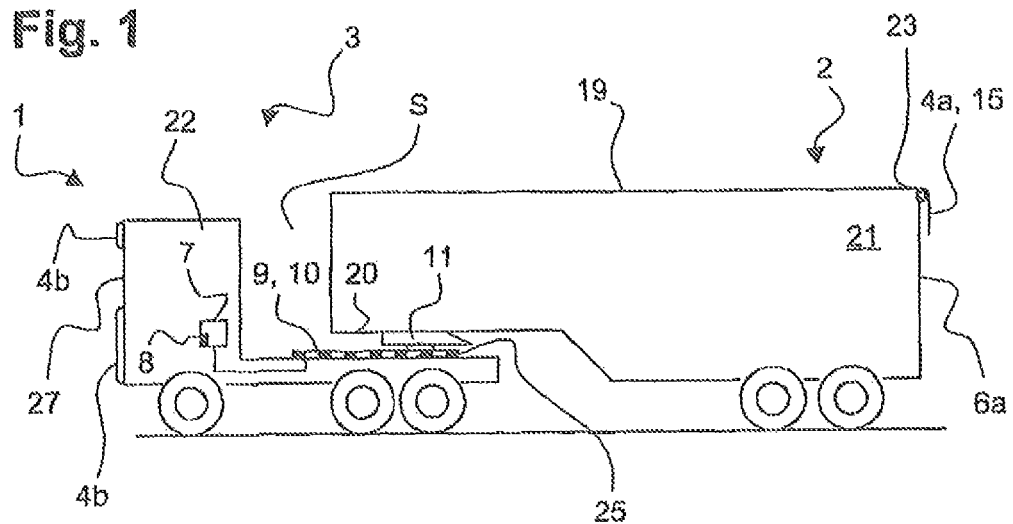
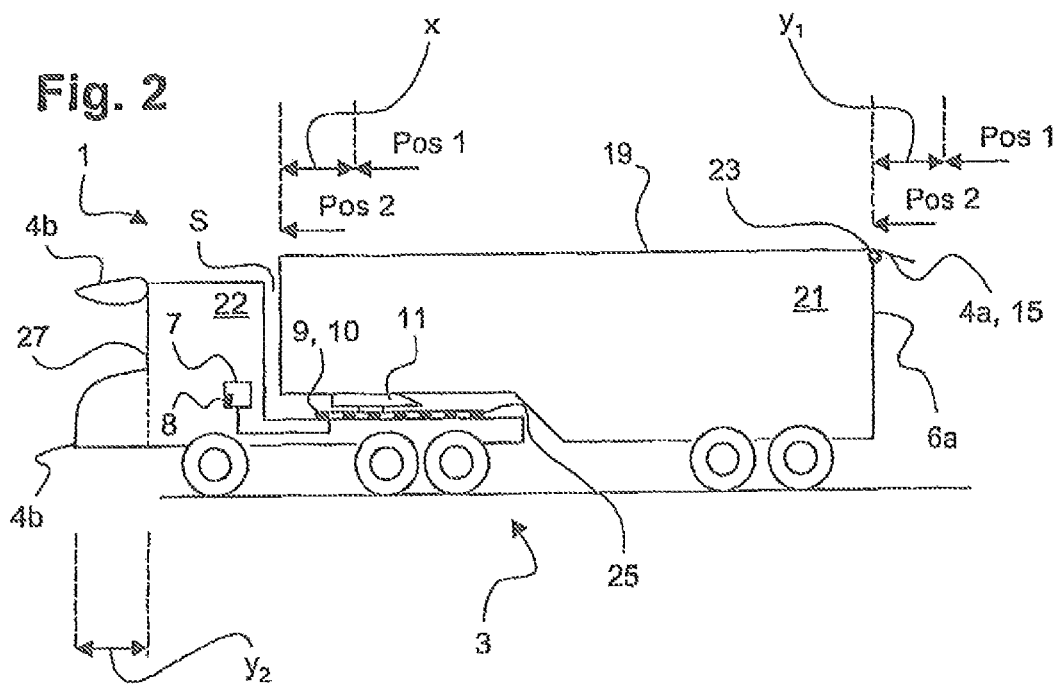

AIR-CONDUCTING SYSTEM

FIELD OF THE INVENTION

The invention concerns an air-conducting system for a tractor and/or trailer, wherein at least one of the vehicles has a wind deflector.

BACKGROUND OF THE INVENTION

The tractor and the trailer in the coupled together condition form a road train. Road trains in the form of a semitrailer or articulated train generally have a maximum transport volume. For this, the cargo space is configured in box shape, but it must satisfy legal requirements in regard to its dimensions. The desire for maximum transport volume on the one hand and observance of legal requirements in terms of outside dimensions on the other hand complicate the design of aerodynamically favorable vehicle shapes and thus a reduced fuel consumption or emission of pollutants.

Wind deflectors are known from the prior art to lessen the aerodynamic drag, being arranged on the roof of the tractor and able to adjust their inclination by motor in order to adapt themselves to the different heights of the trailer or become as flat as possible when driving empty.

WO 20061029732A1 discloses one such wind deflector on the roof of the tractor of a semitrailer, which is furthermore outfitted with a shifting mechanism for a fifth wheel. When driving slow, the fifth wheel can move to the rear on the tractor, so that a wider gap is adjusted between the front wall of the trailer and the rear wall of the driver's cabin, which is advantageous for maneuvering and traveling tight curves. To reduce the aerodynamic drag when traveling fast and in a straight line, this gap can be reduced by moving the fifth wheel in the direction of the driver's cabin, thus reducing the concomitant turbulence at the gap. The wind deflector arranged on the roof should likewise be connected to the control unit of the shifting mechanism and thus be adjustable in its inclination to the size of the gap, so that the inclination is more flat for a large gap and more steep for a narrow gap.

In practice, however, it turns out that the placement of a wind deflector located on the roof of the driver's cabin is not enough to reduce the aerodynamic drag in the desired degree.

SUMMARY OF THE INVENTION

For this reason, the problem of the invention was to bring about a reduction of the aerodynamic drag by other means.

The problem is solved according to the invention with an air-conducting system in which the wind deflector is arranged at the rear and/or in the front region and it can be adjusted in dependence on the driving speed. By an installation position "at the rear" of the vehicle is meant the tailgate of the cargo structure, while the wind deflector should be arranged especially effectively at the upper edge toward the roof wall and/or the edges toward the side walls.

By the installation position "in the front region" is meant the zones that lie in front of the vehicle and whose configuration is of importance to the creation of the flow about the vehicle or for the way in which the flow passes over the vehicle.

The claimed wind deflectors have in common that in the deployed working position they bring about a lengthening of the tractor or of the semitrailer or articulated trailer.

Consequently, the installation position for the wind deflector in the tractors of articulated trailers is located at the rear end of the tractor, which accomplishes a reduction in the aerodynamic drag to a particular extent, even when driving without a towed vehicle. When driving with a towed vehicle, or in the case of semitrailers, the wind deflector is arranged at the upper rear edge of the trailer vehicle.

Especially during fast driving on the freeway, there is a massive pressure gradient between the air flowing above the vehicle and the region behind the vehicle contour, which creates a far-reaching wake turbulence. With the help of the tilting of the wind deflector adapted to the driving speed, the turbulence at the rear of the vehicle can be minimized.

Wind deflectors arranged in the front region ensure a favorable flow around the areas of the vehicle situated behind them.

Advantageously, the wind deflector is connected to an electronic control unit. With the help of the control unit, the position of the wind deflector can be controlled especially favorably. It is possible to store in the electronic control unit appropriate characteristics for the angle of attack or the shape of the wind deflector for the different driving situations. Furthermore, a "cargo mode" can be stored in the control unit for the loading and unloading, when the wind deflector is swiveled away from the access zone behind the cargo space.

The electronic control unit should have an interface by which vehicle signals can be transmitted to the control unit. The signals can be provided to the electronic control unit, for example, from the vehicle control unit, while the actual driving speed, but also the steering wheel angle and/or the axle load, preferably serve as the signals.

Preferably, an adjusting mechanism is arranged on the tractor, with which the relative position of tractor and trailer can be changed in the vehicle lengthwise axis during driving operation. Usually the cargo volume is already maximized in the design of the vehicles, such that the legally permitted overall length of the road train is achieved. In this case, a wind deflector arranged in the rear would result in an exceeding of the maximum permitted vehicle length in the swiveled-out position.

But insofar as an adjusting mechanism is present, which pulls the trailer up to the tractor during straight travel and thereby minimizes the gap between the two vehicles in aerodynamically favorable fashion, the shortening of the length of the road train is utilized as swivel room for the wind deflector, without exceeding the permitted vehicle length.

With the preferred embodiment under discussion a method for reducing the aerodynamic drag of a road train was also developed, in which a wind deflector and an adjusting mechanism for changing the relative position of tractor and trailer in the vehicle lengthwise axis are provided, wherein the trailer during straight travel of the road train is pulled from a rear position to a forward position and the space thus freed up in the rear or front region is used by the wind deflector to swivel out. The maximum permissible vehicle length is always observed in this way.

When braking or traveling on a curve, the distance between the vehicles is increased and the wind deflector is at least partly retracted to reduce the overall length of the road train.

According to one favorable embodiment, the adjusting mechanism is a shifting mechanism for a fifth wheel. The fifth wheel is supported by its two bearing blocks on a carriage, which is guided in the vehicle lengthwise direction on two parallel rails and can generally be locked relative to them. The shifting mechanism furthermore comprises an actuating means, such as a hydraulic cylinder, which allows the trailer to move during vehicle operation against the direction of travel and thereby pulls the trailer up to the driver's cabin of the tractor. Before moving the fifth wheel, another actuating cylinder can be used to lift the usually form-fitting lock between carriage and rails. The gap between the vehicles should only be reduced in driving operation during fast straight-line travel. During maneuvering or panic braking, the maximum gap between the vehicles must be restored in the shortest of time, in order to avoid the trailer from striking against the tractor.

Likewise, the adjusting mechanism can be a shifting mechanism for a trailer coupling, if the invention is implemented on an articulated train. In this case, the trailer coupling is first pulled under the tractor against the direction of travel.

If the structural space underneath the tractor is not enough, instead of the movable vehicle coupling one can also design the complementary coupling components of the trailer to be movable.

Advisedly, the adjustment mechanism is connected to the control unit. Thus, a common control unit controls both the adjustment mechanism and the rear wind deflector, so that an especially prompt adapting of the position of the wind deflector to the actual position of the trailer is accomplished.

Advantageously, the rear wind deflector is configured in the form of a flap. In this embodiment, the wind deflector swivels about a horizontal axis and in the retracted position approaches the rear of the cargo space. In this retracted position, the semitrailer or articulated train has its shortest vehicle length and even in the rearmost position of the trailer it fulfills the legal requirements in regard to the maximum permissible vehicle length. When the trailer is pulled forward during driving operation, the wind deflector in flap form swivels about its hingelike fastening and positively influences the adjacent air flow.

Alternatively, the wind deflector can comprise inflatable air-conducting element. These can be fed, for example, via the pneumatic supply system of the trailer. Especially preferable is a combination of the flap form and air-conducting elements located underneath in the form of an air bellows.

According to another alternative embodiment, the wind deflector has telescoping air-conducting elements. These are comparable to extensible landing flaps on an airplane wing and can also be retracted in several steps, thus saving space. A major advantage of the telescoping air-conducting elements is that the space behind the vehicle remains free and the air-conducting elements do not get in the way when loading and unloading.

Extensible flap systems can also be considered for the front wind deflector. However, inflatable air-conducting elements are especially advantageous, since these act as buffers in event of a collision.

BRIEF DESCRIPTION OF THE DRAWINGS

For a better understanding, the invention shall now be explained more closely by means of nine figures. There are shown:

FIG. 1, a schematic side view of a semitrailer with trailer moved backward and wind deflectors retracted;

FIG. 2, a view per FIG. 1 with trailer moved forward and wind deflectors extended;

DETAILED DESCRIPTION OF THE INVENTION

Figure 3:
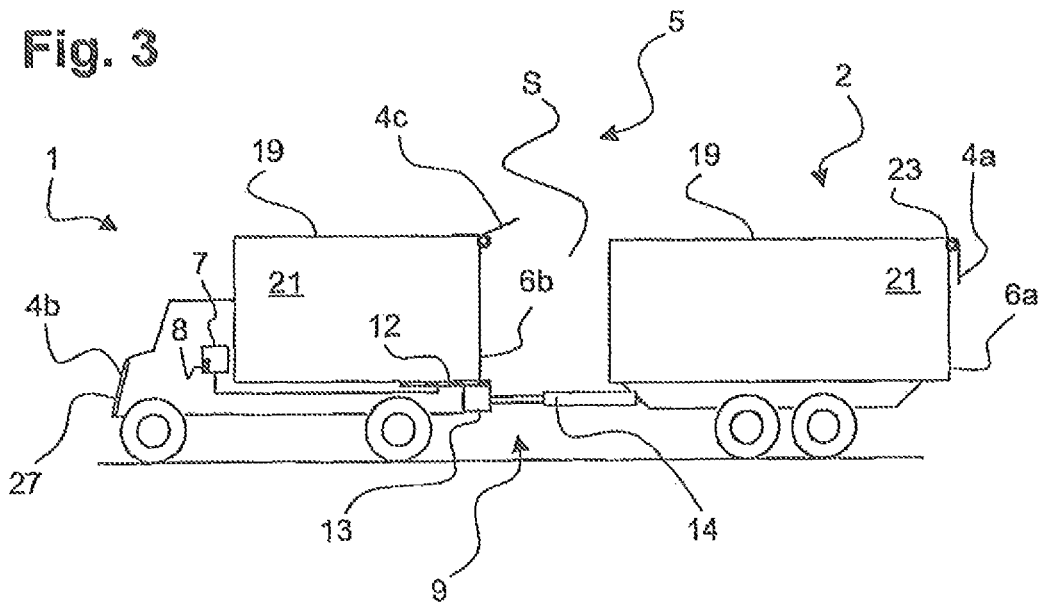
FIG. 3, a schematic side view of an articulated train with trailer moved backward and wind deflectors retracted.

FIG. 1 shows a schematic side view of a semitrailer 3 formed from a tractor 1 and a trailer 2 mechanically coupled to it by a fifth wheel 11.

The trailer 2 lies on the fifth wheel 11 by a bearing plate 20 in its forward section and is additionally connected detachably to the fifth wheel in customary fashion by a king pin (not shown). For goods transport, the trailer 2 has a cargo space 21, which is bounded at the top by a roof wall 19 and at its rear end by a tailgate 6a.

According to the invention, a wind deflector 4a with a flap 15 is situated on the roof edge 23 in the transition zone from the roof wall 19 to the tailgate 6a. The flap 15 can swivel about a pivot axis 24 running parallel with the roof edge 23 (see FIG. 5). With the help of the flap 15, turbulence occurring at the rear 6a of the trailer 2 and thus the fuel consumption of the semitrailer 3 can be reduced.

The representation of FIG. 1 shows the fifth wheel 11 in a rear position on an adjusting mechanism 9, which is configured as a shifting mechanism 10 of the fifth wheel 11. The shifting mechanism 10 comprises guide rails 25 running at least in the direction of travel and a pressurized cylinder (not shown), by which the position of the fifth wheel 11 on the guide rails 25 can be adjusted in the lengthwise direction. In the position of the fifth wheel according to FIG. 1, the overall semitrailer 3 has its maximum length.

The shifting mechanism 10 is connected to a control unit 7 and receives a signal from it during driving operation to move the fifth wheel 11 as close as possible to the driver's cabin 22 of the tractor 1. This reduces turbulence of the air flow thanks to the gap S between driver's cabin 22 and trailer 2. This process does not need to be initiated by the driver, since the control unit 7 receives signals from the vehicle control unit (not shown) via an interface 8 that take into account in particular the actual speed of travel, FIG. 2 shows the semitrailer 3 in driving operation on a straight stretch of road. This usually occurs on freeways and usually involves a high speed of travel, where the wind deflector 4a works especially effectively on the air flowing around the rear 6a and minimizes turbulence.

During rapid straight travel, the trailer 2 has been pulled via the adjustment mechanism 9 up to the driver's cabin 22 from the rear position Pos 1 to the forward position Pos 2 along the movement path x. This reduces the gap S between tractor 1 and trailer 2, as well as the overall length of the semitrailer by the amount of the movement path x, so that the wind deflector 4a has available exactly the same movement path $y_1$ for swiveling, without exceeding the legally mandated maximum length of the semitrailer 3.

As a supplement to the wind deflector 4a swiveled out at the rear 6a of the trailer 2, the tractor 1 also has two wind deflectors 4b arranged in the front region 27. In the extended working position shown, these wind deflectors 4b lengthen the tractor 1 and thus the overall semitrailer 3 toward the front. One of the wind deflectors 4b arranged in the front region is situated in a vertical section between the windshield and the bumper. The second wind deflector 4b arranged in the front region 27 is positioned above this and conducts the air flow away across the driver's cabin 22.

If no wind deflector 4a is present or activated on the trailer 2, the wind deflectors 4b in the front region 27 each have available, as maximum path of movement, the movement path $y_2$ corresponding to the movement path x of the trailer 2. If both a wind deflector 4a at the rear 6a of the trailer 2 and a wind deflector 4b in the front region are used together, the sum of the movement paths $y_1$, $y_2$ can correspond at most to the movement path x of the trailer 2.

FIG. 3 shows the invention on an articulated train 5, which likewise consists of a tractor 1 and a trailer 2, in a starting position. Unlike a semitrailer 3, both the tractor 1 and the trailer 2 of the articulated train 5 are configured with a cargo space 21. The trailer 2 is mechanically coupled to the tractor 1 by a hitch 14 with a trailer coupling 13.

After attaining a minimum speed that is stored in the control unit 7, a wind deflector 4c arranged at the rear 6b of the tractor 1 moves from a folded to an extended position. When the tractor 1 is driving without a trailer 2, this substantially diminishes the turbulence at the tailgate 6b of the tractor 1.

The wind deflector 4b arranged in the front region 27 is in a resting position and integrated into the contour of the tractor 1.

If a trailer 2 is additionally coupled on, the wind deflector 4c of the tractor 1 bridges the gap S and minimizes turbulence between the tractor 1 and the trailer 2.

The trailer 2 also has a wind deflector 4a at the roof edge 23, which is folded against the tailgate 6a in the starting position shown in FIG. 3. This is necessary so that the maximum length of the articulated train 5 is not exceeded.

Figure 4:
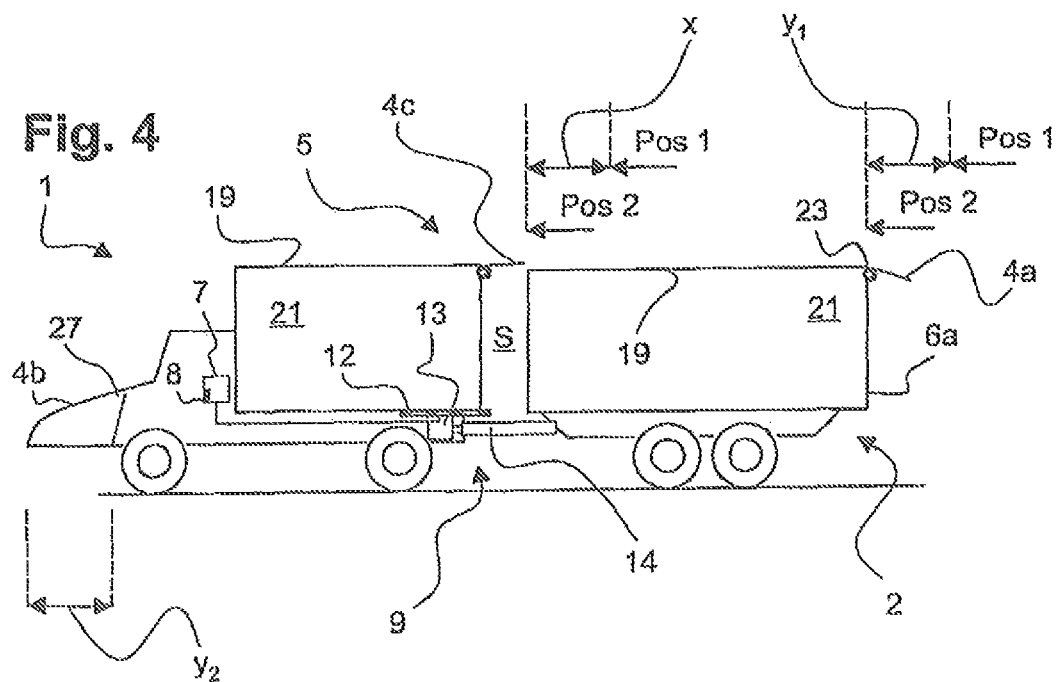
FIG. 4, a view per FIG. 3 with trailer moved forward and wind deflectors extended.

FIG. 4 shows the articulated train 5 during fast straight-line travel, where the trailer coupling 13 is drawn by means of a shifting mechanism 2 underneath the chassis of the tractor 1 and has thereby moved the trailer 2 from position Pos 1 to Pos 2 by the amount of the movement path x. As a result, the length of the articulated train 5 was reduced during driving, so that the wind deflector 4a can likewise be extended. The wind deflector 4a now has available to it the same movement path $y_1$ in terms of magnitude as the movement path x, without exceeding the maximum permitted length of the articulated train 5. However, the movement path $y_1$ cannot be utilized to the full extent if the wind deflector 4b of the tractor 1 was additionally extended in the front region 27. The wind deflector 4b serves to extend the original contour of the tractor 1 and guide the air flow around the structures located behind it. In this case, the sum of the movement paths $y_1$, $y_2$ can correspond at most to the movement path x of the trailer 2.

Figure 5:
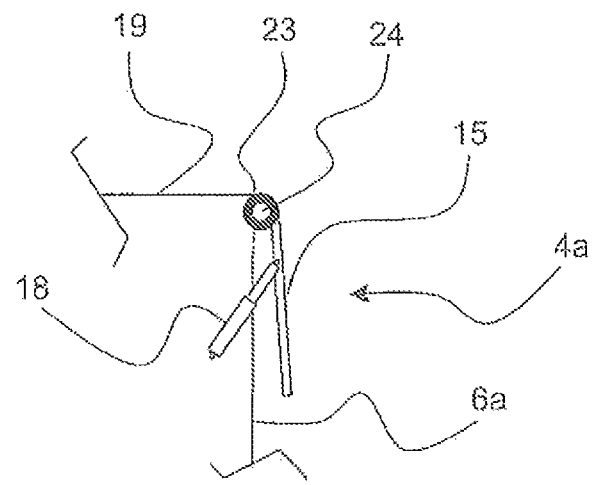
FIG. 5, an enlarged side view of a wind deflector arranged at the rear according to a first embodiment.
Figure 6:
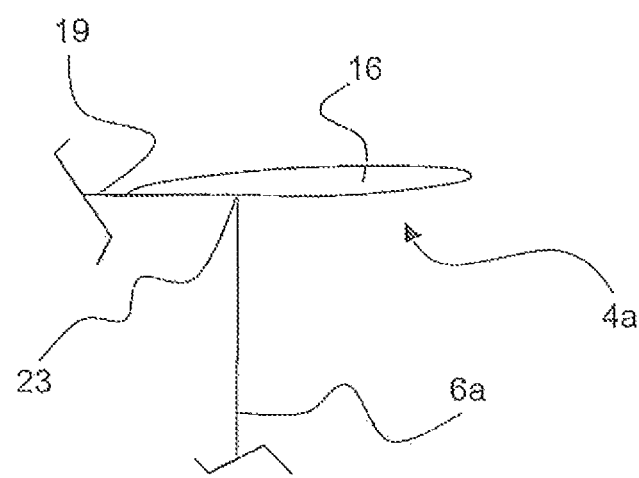
FIG. 6, an enlarged side view of a wind deflector arranged at the rear according to a second embodiment.
Figure 7:
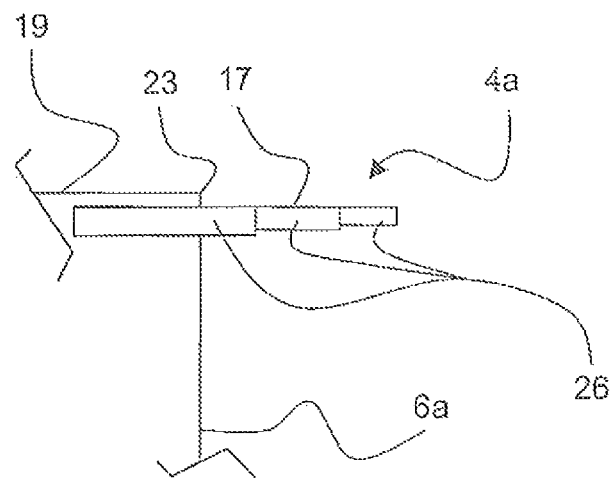
FIG. 7, an enlarged side view of a wind deflector arranged at the rear according to a third embodiment.

FIGS. 5 to 7 show sample wind deflectors 4a, which could basically be mounted in identical design as wind deflectors 4c on the tailgate 6b of the tractor 1.

The embodiment disclosed in FIG. 6 concerns a wind deflector 4a in the form of a flap 15, which is mounted and can swivel on the rear edge 23 of the abutting roof wall 19 and tailgate 6a. The pivot axis runs parallel to the dimension of the roof edge 23 or transverse to the direction of driving. The angle of attack of the flap 15 can be varied by means of an actuator 18. The actuator 18, in particular, is a fluid-operated cylinder, especially preferably a pneumatic cylinder.

FIG. 5 shows an alternative embodiment, in which the wind deflector 4a is configured as an inflatable air-conducting element 16, corresponding to FIG. 7. Once a sufficient movement path y1 is available for the extending of the wind deflector 4a (see FIG. 2, 4), the air-conducting element 16 is activated with pressurized air, for example, from the pressurized air system of the semitrailer or articulated train 3, 5. After reaching a minimum pressure, the inflatable air-conducting element 16 lifts up and assumes its intended shape. The retracting of the air-conducting element 16 is done by releasing the air contained therein.

According to a third alternative embodiment, the wind deflector 4a can also be configured as a telescoping air-conducting element 17. In this case, at least two segments 26 move relative to each other and thereby bring the telescoping air-conducting element 17 into an extended working position.

Figure 8:
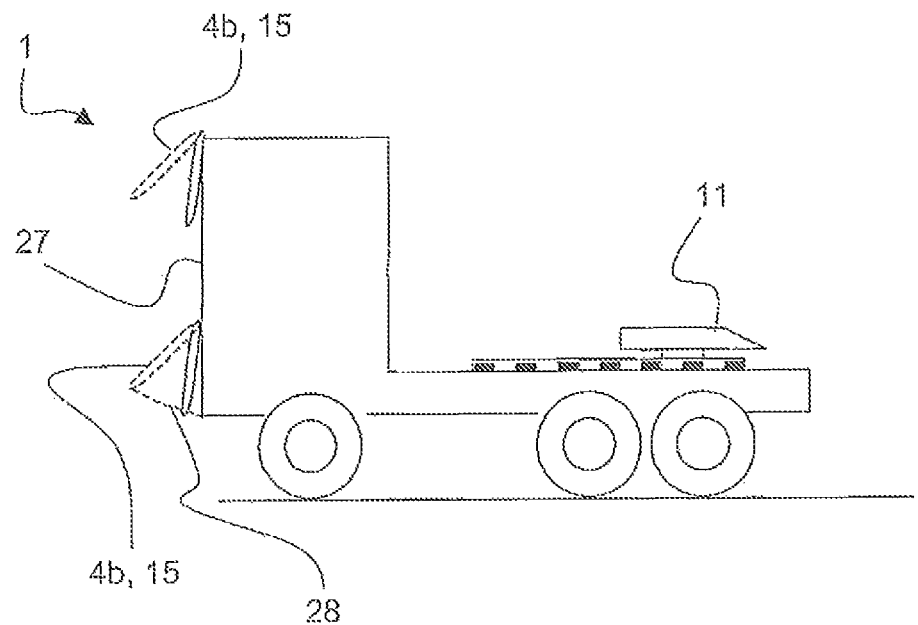
FIG. 8, a side view of a wind deflector arranged in the front region according to a first embodiment, and FIG. 9, a side view of a wind deflector arranged in the front region according to a second embodiment.

FIG. 8 shows a tractor 1 with two wind deflectors 4b in flap form 15, one above the other, in the retracted resting position and the extended working position (broken line). For an especially effective conducting of the air, the lower wind deflector 4b additionally has an apron 28, which is deployed by the extending of the flap 15.

Figure 9:
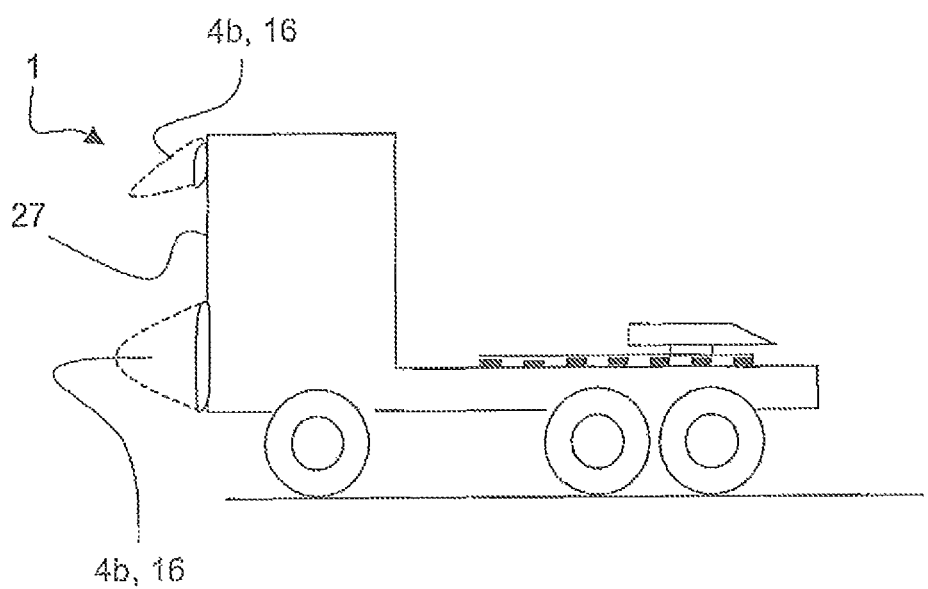

FIG. 9 shows an alternative embodiment of the wind deflectors 4b located in the front region 27, which comprise inflatable air-conducting elements 16 and assume their intended shape by receiving pressurized air. This embodiment offers the additional benefit of a cushioning in event of collisions when mounted in the front region 27.

LIST OF REFERENCE SYMBOLS 1 tractor
2 trailer
3 semitrailer
4a wind deflector, trailer
4b wind deflector, tractor front
4c wind deflector, tractor rear
5 articulated train
6a rear/tailgate, trailer
6b rear/tailgate, tractor
7 control unit
8 interface
9 adjusting mechanism
10 shifting mechanism, fifth wheel
11 fifth wheel
12 shifting mechanism, trailer coupling
13 trailer coupling
14 hitch
15 flap
16 inflatable air-conducting elements
17 telescoping air-conducting elements
18 actuator
19 roof wall
20 bearing plate
21 cargo space
22 driver's cabin
23 roof edge
24 pivot axis
25 guide rails
26 segment, air-conducting element
27 front region
28 apron
Pos 1 rear position, trailer
Pos 2 forward position, trailer
x movement path of trailer
$y_1$ movement path, rear wind deflector
$y_2$ movement path, front wind deflector
S gap between vehicles

What is claimed is:

1. An air-conducting system for a tractor and a trailer together forming a road train, comprising: at least one of the vehicles has a wind deflector and an adjusting mechanism, wherein the adjusting mechanism is arranged on the tractor, with which the relative position of the tractor and trailer can be changed in a lengthwise axis of the road train, and
    wherein the wind deflector is arranged at a rear of the trailer or in a front region of the tractor and the wind deflector can be adjusted in dependence on a driving speed, said wind deflector lengthening in a deployed working position the tractor or trailer, while a shortening of the length of the road train is utilized as swivel room for the wind deflector, such that a permissible length of said road train is not exceeded.

2. The air-conducting system according to claim 1, wherein the wind deflector is connected to an electronic control unit.

3. The air-conducting system according to claim 2, wherein the electronic control unit has an interface by which vehicle signals can be transmitted to the control unit.

4. The air-conducting system according to claim 3, wherein an adjusting mechanism is arranged on the tractor, with which the relative position of tractor and trailer can be changed in the vehicle lengthwise axis.

5. The air-conducting system according to claim 4, wherein the adjusting mechanism is a shifting mechanism for a fifth wheel.

6. The air-conducting system according to claim 5, wherein the adjusting mechanism is a shifting mechanism for a trailer coupling.

7. The air-conducting system according to claim 6, wherein the adjustment mechanism is connected to the control unit.

8. The air-conducting system according to claim 7, wherein the wind deflector is configured with a flap.

9. The air-conducting system according to claim 8, wherein the wind deflector comprises inflatable air-conducting elements.

10. The air-conducting system according to claim 9, wherein the wind deflector comprises telescoping air-conducting elements.

11. The air-conducting system according to claim 1, wherein the adjusting mechanism is a shifting mechanism for a fifth wheel.

12. The air-conducting system according to claim 1, wherein the adjusting mechanism is a shifting mechanism for a trailer coupling.

13. The air-conducting system according to claim 1, wherein the adjustment mechanism is connected to the control unit.

14. The air-conducting system according to claim 1, wherein the wind deflector is configured with a flap.

15. The air-conducting system according to claim 1, wherein the wind deflector comprises inflatable air-conducting elements.

16. The air-conducting system according to claim 1, wherein the wind deflector comprises telescoping air-conducting elements.

17. A method for reducing the aerodynamic drag of a road train, comprising the steps of:
   providing a wind deflector and an adjusting mechanism for changing a relative position of a tractor and a trailer in a vehicle lengthwise axis; and
   pulling the trailer during straight travel of the road train from a rear position to a forward position and a space is thus freed up in a rear or a front region that is used by the wind deflector to swivel out.

* * * * *